United States Patent
Han

(10) Patent No.: US 9,266,563 B1
(45) Date of Patent: Feb. 23, 2016

(54) MOUNTING UNIT FOR SUB-FRAME

(71) Applicant: Hyundai Motor Company, Seoul (KR)

(72) Inventor: Minuke Han, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/548,985

(22) Filed: Nov. 20, 2014

(30) Foreign Application Priority Data

Sep. 2, 2014 (KR) ........................ 10-2014-0116415

(51) Int. Cl.
*B62D 21/11* (2006.01)
*B62D 21/00* (2006.01)

(52) U.S. Cl.
CPC ................ *B62D 21/11* (2013.01); *B62D 21/00* (2013.01); *B60G 2204/15* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,183,286 | A * | 2/1993 | Ayabe | 280/124.1 |
| 5,468,018 | A * | 11/1995 | Redman et al. | 280/788 |
| 6,375,221 | B1 * | 4/2002 | Kudou | 280/788 |
| 6,666,438 | B2 * | 12/2003 | Nakagawa | 267/141.2 |
| 6,767,020 | B2 * | 7/2004 | Yamamoto et al. | 280/124.109 |
| 6,877,754 | B2 * | 4/2005 | Kim | 280/124.109 |
| 7,393,015 | B1 * | 7/2008 | Gillespie et al. | 280/781 |
| 7,445,243 | B2 * | 11/2008 | Park | 280/785 |
| 7,784,858 | B2 * | 8/2010 | Abe et al. | 296/203.04 |
| 7,854,474 | B2 * | 12/2010 | Cox | 296/204 |
| 7,938,414 | B2 * | 5/2011 | Buschjohann et al. | 280/124.109 |
| 8,267,429 | B2 * | 9/2012 | Takeshita et al. | 280/784 |
| 8,366,150 | B2 * | 2/2013 | Parsons et al. | 280/797 |
| 8,490,988 | B2 * | 7/2013 | Takeshita et al. | 280/124.109 |
| 8,714,635 | B2 * | 5/2014 | Tomozawa et al. | 296/193.09 |
| 8,794,696 | B2 * | 8/2014 | Iseki et al. | 296/204 |
| 8,905,466 | B2 * | 12/2014 | Iseki et al. | 296/203.02 |
| 8,925,991 | B2 * | 1/2015 | Caliskan et al. | 296/29 |
| 8,936,302 | B2 * | 1/2015 | Miyahara et al. | 296/203.01 |
| 8,967,671 | B2 * | 3/2015 | Kim et al. | 280/785 |
| 8,998,305 | B2 * | 4/2015 | Obata et al. | 296/193.08 |
| 2005/0046215 | A1 * | 3/2005 | Chung | 296/29 |
| 2005/0077754 | A1 * | 4/2005 | Tomita | 296/187.03 |
| 2006/0197300 | A1 * | 9/2006 | Nakashima et al. | 280/124.109 |
| 2006/0284449 | A1 * | 12/2006 | Miyahara | 296/204 |
| 2007/0273179 | A1 * | 11/2007 | Hommel et al. | 296/204 |
| 2012/0286543 | A1 * | 11/2012 | Lee | 296/204 |
| 2014/0015284 | A1 * | 1/2014 | Mildner et al. | 296/193.08 |
| 2014/0157603 | A1 * | 6/2014 | Kim et al. | 29/897.2 |
| 2014/0232146 | A1 * | 8/2014 | Choi et al. | 296/204 |
| 2014/0368000 | A1 * | 12/2014 | Komiya | 296/193.07 |
| 2015/0042121 | A1 * | 2/2015 | Huang et al. | 296/35.2 |

(Continued)

FOREIGN PATENT DOCUMENTS

DE 102014004346 A1 * 10/2014
DE 102014205865 A1 * 12/2014

(Continued)

*Primary Examiner* — Nicole Verley
(74) *Attorney, Agent, or Firm* — Morgan, Lewis & Bockius LLP

(57) ABSTRACT

A mounting unit for a sub-frame for fastening the sub-frame to a side member of a vehicle body may include a pipe nut installed to be inserted into a through-hole above a mounting portion of the side member, a sub-frame bracket fixed under the side member to correspond to the pipe nut and including a fastening hole to which a lower end portion of the pipe nut may be fastened, and a reinforcing bracket fixed to an inner side of the side member and fixing an upper end portion of the pipe nut.

5 Claims, 5 Drawing Sheets

(56) References Cited

U.S. PATENT DOCUMENTS

2015/0061272 A1\* 3/2015 Watanabe et al. ............. 280/784
2015/0075896 A1\* 3/2015 Imanishi et al. ............. 180/312

FOREIGN PATENT DOCUMENTS

KR 10-1488210 B1 1/2015
WO WO 2014017260 A1 \* 1/2014

\* cited by examiner

MOUNTING UNIT FOR SUB-FRAME

CROSS-REFERENCE TO RELATED APPLICATION

The present application claims priority to and the benefit of Korean Patent Application No. 10-2014-0116415 filed on Sep. 2, 2014, the entire contents of which is incorporated herein for all purposes by this reference.

BACKGROUND OF THE INVENTION

1. Field of the Invention

The present invention relates to a mounting unit for a sub-frame, and more particularly, to a mounting unit for a sub-frame that is capable of improving assembly quality, reducing its weight, and improving NVH performance by improving ease of assembly between a side member and the sub-frame.

2. Description of Related Art

In general, a sub-frame is bolted to be assembled to a front side member in a center supportive type of vehicle.

FIG. 1 is a perspective view to describe a method for assembling a general front side member and a sub-frame.

Referring to FIG. 1, the sub-frame 101 is fastened by bolts 107 to a lower part of each of respective front side members 103 so as to be assembled thereto.

In the sub-frame 101, an engine (not shown) and a transmission (not shown) are disposed in front and rear directions, and buckling of the sub-frame 101 is induced to allow the engine to be dropped since the engine is designed to not be pushed toward a dash panel of a vehicle body as a rigid body, thereby guaranteeing collision safety.

The sub-frame 101 is fastened to the lower part of the front side member 103 by the bolt 107 through a mounting unit 105 for the sub-frame (hereinafter referred to as a "mounting unit").

In order to fasten the sub-frame 101 to the lower part of the front side member 103, such a conventional mounting unit 105 includes a mounting bracket 109 that is bonded to the lower part of the front side member 103, and a pipe nut 111 that is installed between the mounting bracket 109 and the front side member 103.

That is, the sub-frame 101 is fastened to the front side member 103 through the pipe nut 111 and the bolt 107 under the mounting bracket 109.

However, such a conventional mounting unit 105 for the sub-frame has a structure in which the pipe nut 111 is simply fixed by the mounting bracket 109, thereby having a drawback of frequent defective assembly straightness and insufficient connection stiffness.

Accordingly, when a head-on collision of a vehicle occurs, the vehicle can be easily damaged.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a mounting unit for a sub-frame in which a lower part of a pipe nut is fixed between a reinforcing bracket fixed to an inner side of the side member and a sub-frame bracket combined to a lower part of a side member to the sub-frame bracket by welding while being screw-coupled thereto, thereby ensuring assembly straightness of the pipe nut and improving connection stiffness by a reinforcing bracket.

In addition, the exemplary embodiment of the present invention provides a sub-frame bracket that can be cast molded from an aluminum material and thus has a reduced weight.

In an aspect of the present invention, a mounting unit for a sub-frame for fastening the sub-frame to a side member of a vehicle body, may include a pipe nut installed to be inserted into a through-hole above a mounting portion of the side member, a sub-frame bracket fixed under the side member to correspond to the pipe nut and including a fastening hole to which a lower end portion of the pipe nut is fastened, and a reinforcing bracket fixed to an inner side of the side member and fixing an upper end portion of the pipe nut.

The sub-frame bracket may include a fastening portion formed with a fastening hole to which the lower end portion of the pipe nut is fastened, a body coupled to a plurality of ribs that are radially formed at a circumference of the fastening portion, and a coupling portion formed at an upper end of the body and insertedly fixed to a lower part of the side member.

The sub-frame bracket is integrally cast molded from an aluminum material, and is bonded by welding to the lower part of the side member through the coupling portion.

The sub-frame bracket is cast molded from an aluminum material while being inserted with the fastening portion that is formed of a steel material, and is bonded by welding to the lower part of the side member through the coupling portion.

The fastening portion is formed with a fastening hole to which the lower end portion of the pipe nut penetrating the lower part of the side member is screw-coupled, and a guide surface formed to be inclined at an inner circumference of an upper end of the fastening hole and guiding the lower end portion of the pipe nut to the fastening hole.

The pipe nut is bonded to the side member through a flange portion formed at lower circumference thereof while being inserted into the through-hole of the side member.

A fixing hole is formed at a center of the reinforcing bracket that is formed by bending a plate such that the upper end portion of the pipe nut is insertedly fixed to the fixing hole, and the fixing hole is formed with a bonding flange that is bonded to an inner side of the side member along an edge thereof.

In the exemplary embodiment of the present invention, the lower end portion of the pipe nut inserted in the through-hole of the side member is screw-coupled to the sub-frame bracket that is combined to the lower part of the side member, and simultaneously, the upper end portion of the pipe nut is fixed to the reinforcing bracket that is fixed to the inner side of the side member, thereby enhancing assembly straightness of the pipe nut and thus improving ease of assembly and connection stiffness of the sub-frame.

As described above, the connection stiffness between the side member and the sub-frame can be improved to enhance NVH performance.

In addition, the sub-frame bracket is manufactured to be integrally cast molded from aluminum, thereby reducing its weight.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
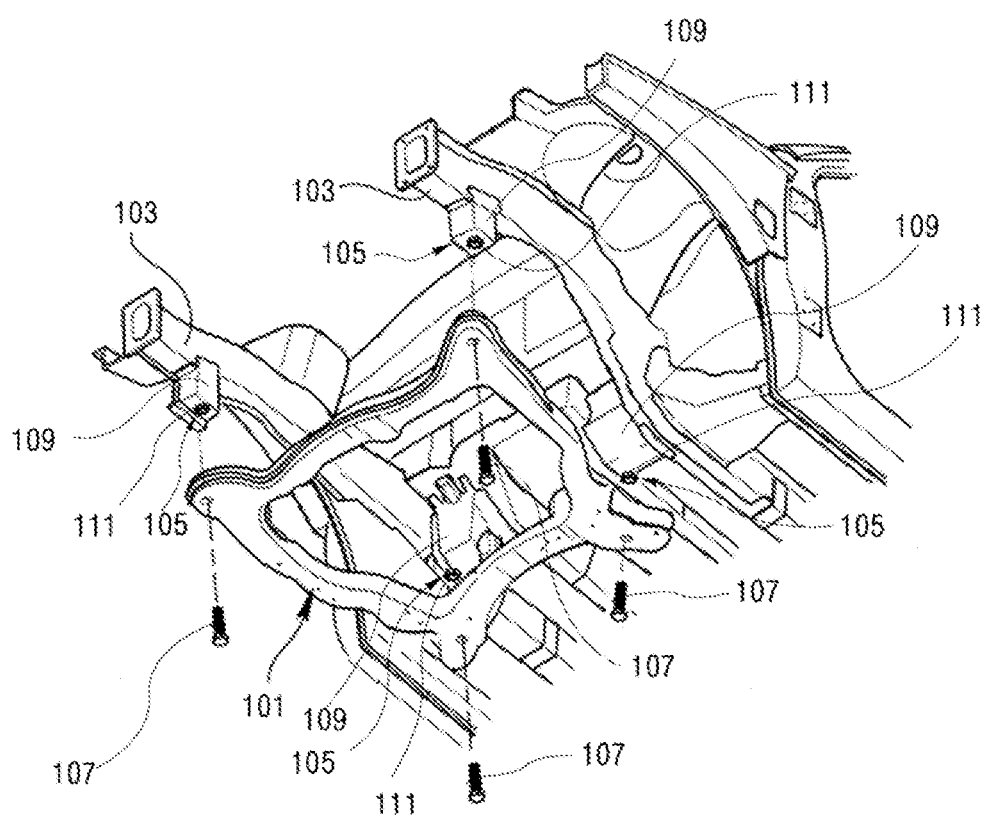
FIG. 1 is a perspective view to describe a method for assembling a general front side member and a sub-frame.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will now be described with reference to the accompanying drawings.

To clearly describe the present invention, parts irrelevant to the description will be omitted.

Figure 2:
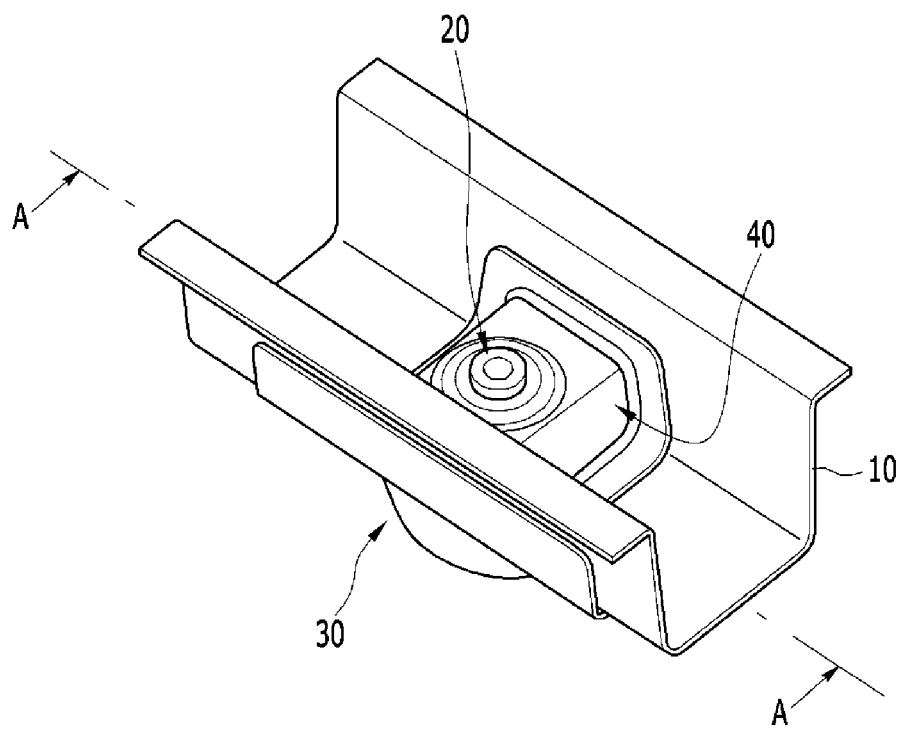
FIG. 2 is a perspective view showing an assembled state of a mounting unit for the sub-frame according to an exemplary embodiment of the present invention.
Figure 3:
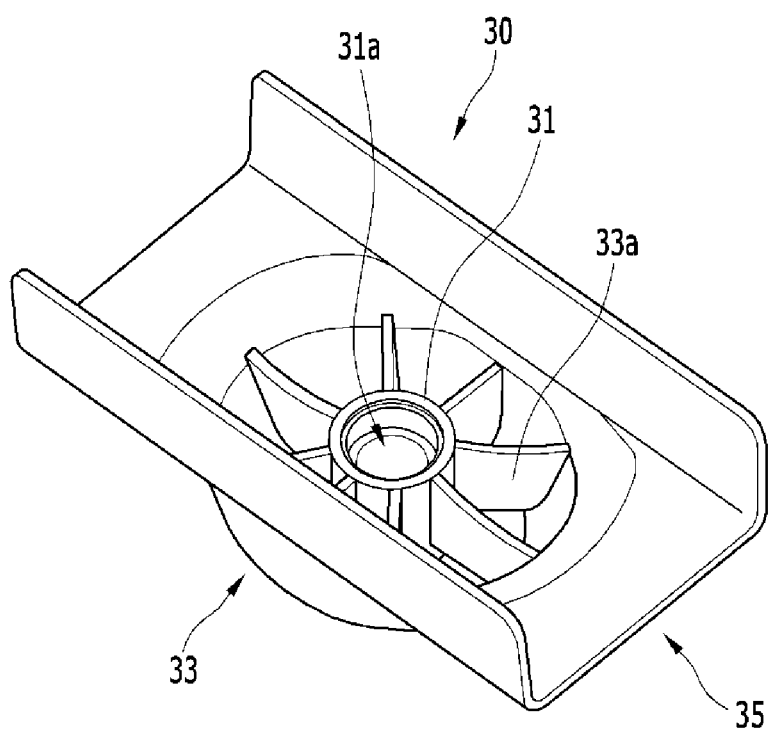
FIG. 3 is a perspective view of a sub-frame bracket of the mounting unit for the sub-frame according to the exemplary embodiment of the present invention.
Figure 4:
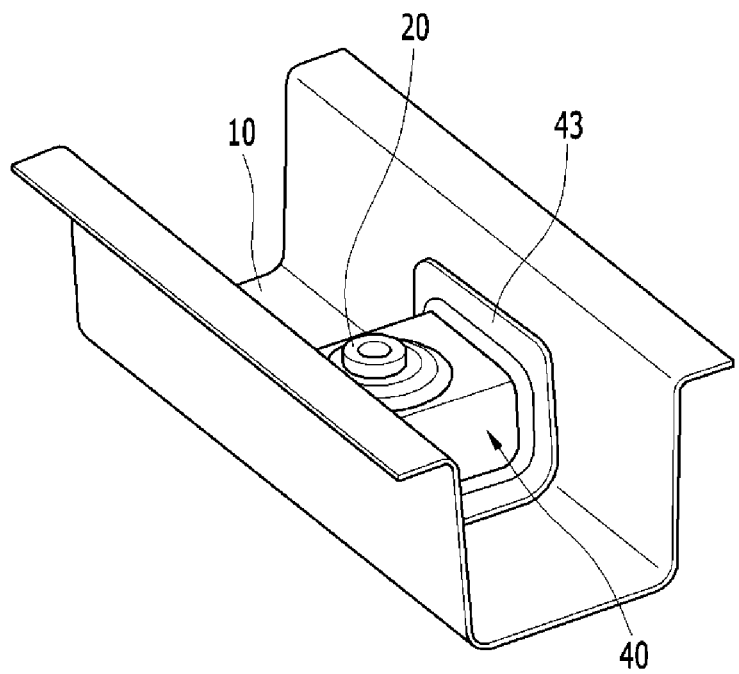
FIG. 4 is a perspective view showing a state of a reinforcing bracket and a pipe nut of the mounting unit for the sub-frame according to the exemplary embodiment of the present invention installed in the side member.
Figure 5:
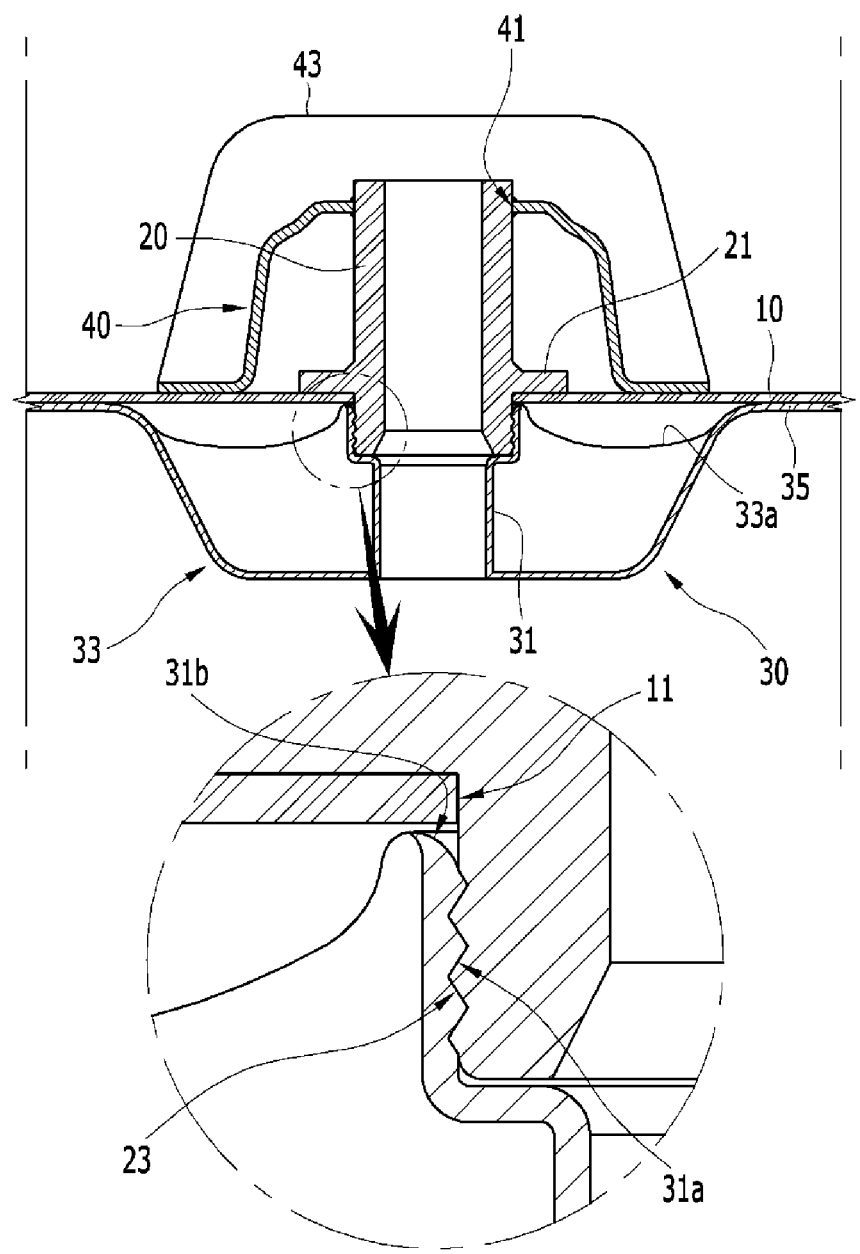
FIG. 5 is a cross-sectional view of FIG. 2 taken along the line A-A.

FIG. 2 is a perspective view showing an assembled state of a mounting unit for the sub-frame according to an exemplary embodiment of the present invention, FIG. 3 is a perspective view of a sub-frame bracket of the mounting unit for the sub-frame according to the exemplary embodiment of the present invention, FIG. 4 is a perspective view showing a state of a reinforcing bracket and a pipe nut of the mounting unit for the sub-frame according to the exemplary embodiment of the present invention installed in the side member, and FIG. 5 is a cross-sectional view of FIG. 2 taken along the line A-A.

Referring to FIGS. 2 to 5, the mounting unit for the sub-frame according to the exemplary embodiment of the present invention includes a pipe nut 20, a sub-frame bracket 30, and a reinforcing bracket 40.

A thread portion 23 is formed at an external circumferential surface of a lower end portion of the pipe nut 20, and is installed to be inserted into a through-hole 11 above a mounting portion of a vehicle body side member 10.

The sub-frame bracket 30 is fixed to a lower part of the side member 10 to correspond to the pipe nut 20, and is formed with a fastening hole 31a such that the thread portion 23 to which it is fastened is formed at a lower end portion of the pipe nut 20.

That is, the sub-frame bracket 30 is fixed by welding to the lower part of the side member 10, and includes a fastening portion 31, a body 33, and a coupling portion 35.

The fastening portion 31 is formed with the fastening hole 31a to which a lower end portion of the pipe nut 20 penetrating the bottom of the side member 10 is screw-coupled, and a guide surface 31b is formed to be inclined at an inner circumference of an upper end of the fastening hole 31a to guide the lower end portion of the pipe nut 20 toward the fastening hole 31a.

The body 33 is coupled to a circumference of the fastening portion 31 through eight ribs 33a that are radially formed at the circumference of the fastening portion 31.

In addition, the coupling portion 35 is formed in the shape of a supporting plate at an upper end of the body 33, and fixes the sub-frame bracket 30 to the side member 10 while being insertedly welded to the lower part of the side member 10.

That is, the coupling portion 35 is formed to have a shape corresponding to the bottom and lateral sides of the side member 10 such that it is insertedly combined to the lower part of the side member 10, and is welded to the side member 10 through its opposite lateral sides.

In this case, the sub-frame bracket 30 may be integrally cast molded from aluminum, and the fastening portion 31 may be integrally cast molded from aluminum while being inserted by parts that are formed of a steel material.

A fixing hole 41 is formed at a center of the reinforcing bracket 40 that is formed by bending a plate, such that the upper end portion of the pipe nut 20 is inserted to be fixed to the fixing hole 41.

In addition, the reinforcing bracket 40 is formed with a bonding flange 43 that is bonded to an inner side of the side member 10 along its edge.

That is, the reinforcing bracket 40 is formed to have a " "⌐" " shape such that it is bonded to the inner side of the side member 10 while the upper end portion of the pipe nut 20 is inserted into the fixing hole 41 to be fixed thereto, and is bonded by welding to the inner surface of the side member 10 through the bonding flange 43 that is formed at the edges.

Accordingly, as shown in FIG. 5, the mounting unit for the sub-frame having a structure described above is configured such that the sub-frame bracket 30 is fixed by welding under the mounting portion of the side member 10 while being inserted therein through the coupling portion 35.

In this case, the fastening portion 31 of the sub-frame bracket 30 is positioned to correspond to the through-hole 11 above the mounting portion of the side member 10.

In such a state where the lower end portion of the pipe nut 20 is inserted into the through-hole 11 of the side member 10, the pipe nut 20 is screw-coupled to the fastening hole 31a that is formed in the fastening portion 31 of the sub-frame bracket 30.

In this case, the lower end portion of the pipe nut 20 is guided toward the fastening hole 31a by the guide surface 31b that is formed in the fastening portion 31, thereby improving ease of assembly.

As described above, while the lower end portion of the pipe nut 20 is screw-coupled to the fastening hole 31a of the sub-frame bracket 30, the pipe nut 20 is welded to be fixed to a circumference of the through-hole 11 above the side member 10 through a flange portion 21 formed at its lower circumference.

In this case, connection stiffness of the sub-frame bracket 30 is ensured by the eight ribs 33a by which the fastening portion 31 is supported in the body 33.

Assembly straightness of the pipe nut 20 is ensured since the upper end portion of the pipe nut 20 is fixed by welding while being inserted into the fixing hole 41 above the reinforcing bracket 40.

Accordingly, in the mounting unit for the sub-frame according to the exemplary embodiment of the present invention, the sub-frame bracket 30 can be cast molded from an aluminum material to reduce its overall weight, and the fastening portion 31, which is made of a steel material and formed with the fastening hole 31a, is inserted to be cast molded, thereby preventing abrasion of the thread formed inside the fastening hole 31a and thus improving the connection stiffness of the pipe nut 20.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A mounting unit for a sub-frame for fastening the sub-frame to a side member of a vehicle body, comprising:
    a pipe nut installed to be inserted into a through-hole above a mounting portion of the side member;
    a sub-frame bracket fixed under the side member to correspond to the pipe nut and including a fastening hole to which a lower end portion of the pipe nut is fastened; and
    a reinforcing bracket fixed to an inner side of the side member and fixing an upper end portion of the pipe nut,
    wherein the sub-frame bracket includes:
        a fastening portion formed with a fastening hole to which the lower end portion of the pipe nut is fastened;
        a body coupled to a plurality of ribs that are radially formed at a circumference of the fastening portion; and
        a coupling portion formed at an upper end of the body and insertedly fixed to a lower part of the side member, and
    wherein the fastening portion is formed with a fastening hole to which the lower end portion of the pipe nut penetrating the lower part of the side member is screw-coupled, and a guide surface formed to be inclined at an inner circumference of an upper end of the fastening hole and guiding the lower end portion of the pipe nut to the fastening hole.

2. The mounting unit for the sub-frame of claim 1, wherein the sub-frame bracket is integrally cast molded from an aluminum material, and is bonded by welding to the lower part of the side member through the coupling portion.

3. The mounting unit for the sub-frame of claim 1, wherein the sub-frame bracket is cast molded from an aluminum material while being inserted with the fastening portion that is formed of a steel material, and is bonded by welding to the lower part of the side member through the coupling portion.

4. The mounting unit for the sub-frame of claim 1, wherein the pipe nut is bonded to the side member through a flange portion formed at lower circumference thereof while being inserted into the through-hole of the side member.

5. The mounting unit for the sub-frame of claim 1, wherein a fixing hole is formed at a center of the reinforcing bracket that is formed by bending a plate such that the upper end portion of the pipe nut is insertedly fixed to the fixing hole, and the fixing hole is formed with a bonding flange that is bonded to an inner side of the side member along an edge thereof.

\* \* \* \* \*